(12) United States Patent
Odell et al.

(10) Patent No.: US 7,754,779 B2
(45) Date of Patent: Jul. 13, 2010

(54) INKS FOR INK JET PRINTING CURABLE BY UV LIGHT INITIATED FREE RADICALS

(75) Inventors: Peter G. Odell, Mississauga (CA); Adela Goredema, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 794 days.

(21) Appl. No.: 11/034,257

(22) Filed: Jan. 13, 2005

(65) Prior Publication Data

US 2006/0155002 A1   Jul. 13, 2006

(51) Int. Cl.
*C09D 11/00* (2006.01)
(52) U.S. Cl. .............................. 522/10; 522/37; 522/39; 522/42; 522/46; 522/64; 522/83; 522/182; 522/183; 523/160
(58) Field of Classification Search .................... 522/75, 522/83, 182, 183, 84, 37, 39, 42, 46, 64, 522/53, 10
See application file for complete search history.

(56) References Cited

U.S. PATENT DOCUMENTS

| | | | |
|---|---|---|---|
| 4,680,368 A | 7/1987 | Nakamoto et al. | |
| 5,889,084 A | 3/1999 | Roth | |
| 6,114,406 A | 9/2000 | Caiger et al. | |
| 6,379,444 B1 * | 4/2002 | Adkins et al. | 106/31.6 |
| 6,467,897 B1 | 10/2002 | Wu et al. | |
| 6,536,889 B1 | 3/2003 | Biegelsen et al. | |
| 6,547,380 B2 | 4/2003 | Smith et al. | |
| 6,561,640 B1 | 5/2003 | Young | |
| 6,720,042 B2 * | 4/2004 | Ylitalo et al. | 428/32.26 |
| 6,896,937 B2 * | 5/2005 | Woudenberg | 427/511 |
| 2004/0145639 A1 | 7/2004 | Noutary | |

FOREIGN PATENT DOCUMENTS

| | | |
|---|---|---|
| EP | 1 358 283 B1 | 9/2004 |
| GB | 2336594 A | 10/1999 |
| WO | 97/31071 | 8/1997 |

* cited by examiner

*Primary Examiner*—Susan W Berman
(74) *Attorney, Agent, or Firm*—Oliff & Berridge, PLC

(57) ABSTRACT

An ink for an ink jet printer includes an ink vehicle of at least one radically curable, multifunctional acrylate monomer or oligomer, at least one colorant, and at least one photoinitiator. The ink has a low viscosity at low jetting temperatures of 30 to 50° C. and is curable upon exposure to ultraviolet radiation.

19 Claims, No Drawings

US 7,754,779 B2

INKS FOR INK JET PRINTING CURABLE BY UV LIGHT INITIATED FREE RADICALS

This invention was made with United States Government support under Agreement No. 70NANB7H3007 awarded by National Institute of Standards and Technology (NIST). The United States Government has certain rights in this invention.

BACKGROUND OF THE INVENTION

1. Field of Invention

Embodiments of the invention are directed to inks for use in ink jet printing. More in particular, low viscosity, substantially solvent-free inks that are curable by free radical initiation upon exposure to ultraviolet (UV) light are described.

2. Description of Related Art

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure that it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to six rotations (incremental movements) of a substrate (an image receiving member or intermediate member) with respect to the ink jetting head, i.e., there is a small translation of the printhead with respect to the substrate in between each rotation. This approach simplifies the printhead design, and the small movements ensure good droplet registration.

Piezoelectric ink jet devices typically suffer from two shortcomings. First, the images formed are presently not very robust. Second, the printers consume large amounts of energy.

Hot melt inks typically used with ink jet printers of the aforementioned type utilize a wax based ink vehicle, e.g., a crystalline wax ink. Such solid ink jet inks provide vivid color images. However, the use of crystalline waxes also has at least two shortcomings. First, the printhead must be kept at least at 135° C. throughout printing with the device. The wax based inks are heated to such high temperatures to decrease their viscosity for proper jetting. Moreover, if the printhead is cooled and re-warmed, a lengthy purge cycle that consumes significant amounts of ink must be carried out. Second, the brittle crystalline waxes do not provide robust images and are easily scratched. This is because wax based inks generally crystallize at temperatures greater than room temperature and therefore, the wax based ink that has been transferred to the recording medium is essentially as hard as it will get. The high energy consumption, waste of expensive ink during purging, and fragile images all cause customer dissatisfaction, and in some markets prevent any sales penetration at all.

SUMMARY OF THE INVENTION

Therefore, what is desired is a low viscosity ink jet ink that can address one or more, and preferably all, of the foregoing disadvantages associated with conventional wax-based solid ink jet inks.

In embodiments, the ink is an ink for an ink jet printer that comprises an ink vehicle of at least one radically curable, multifunctional acrylate monomer or oligomer, at least one colorant, and at least one photoinitiator.

The ink has a low viscosity at low jetting temperatures of 30 to 50° C. and is curable upon exposure to ultraviolet radiation.

In further embodiments, the ink comprises an ink vehicle comprised of at least one acrylate material having a functionality of two or more and at least one monofunctional acrylate material, at least one colorant, and at least one photoinitiator.

DETAILED DESCRIPTION OF PREFERRED EMBODIMENTS

The inks of embodiments of the invention are low viscosity inks that are substantially free of solvents. Low viscosity, as used herein, refers to an ink that has a viscosity of between about 5 and about 20 cP, preferably between about 8 and about 15 cP, and most preferably about 10 to about 15 cP, at the preferred operating temperatures of the printhead, i.e., at temperatures of from about 30 to about 50° C. The viscosity was measured using a Rheometrics (now TA Instruments) RFS rheometer. The inks are thus inks that are melted to jetting viscosity at low temperatures, i.e., temperatures of about 30 to about 50° C., more preferably temperatures of about 35 to about 40° C. This is substantially lower than conventional wax-based inks that are jetted at temperatures of about 130° C.

The printhead performs best when it is at a stable temperature. This may be achieved in a typical office or print shop environment by providing a thermal gradient with respect to ambient. Thus, in a most preferred embodiment, a printhead operating temperature of about 35 to about 40° C., or about 10 to 20° C. above room temperature, provides a stable operating temperature. Accordingly, the inks are most preferably designed to reach the operating viscosity of the printhead, e.g., most preferably 11 to 14 cPs, at the operating temperature of about 35 to about 40° C.

The inks of the invention do not rely on temperature differential between the ink and image receiving substrate, as in conventional wax-based inks, for curing. Instead, the inks include a material that is readily cured using ultraviolet (UV) light initiated free radicals. The images formed by such inks, following UV curing, are tough, crosslinked images.

The inks are characterized by having low volatility, good safety characteristics, and the desired viscosity, which can be readily cured using UV light initiated free radicals.

In one preferred embodiment, the ink comprises an ink vehicle comprised of at least one radically curable, multifunctional acrylate monomer or oligomer, at least one colorant, and at least one photoinitiator.

As the ink vehicle, the ink preferably contains at least one radically curable, multifunctional low volatility monomer or oligomer. Multifunctional as used herein refers to a functionality of at least two, i.e., a material having two or more reactive/crosslinking sites therein. Oligomer as used herein refers to a material that has a multiplicity of monomer units therein (i.e., dimer, trimer, etc.) and a weight average molecular weight of from about 10 to about 10,000, or higher. Although an oligomer can have higher molecular weights, typically a material with a molecular weight of greater than 10,000 tends to have more of a polymeric than monomeric structure. Like monomers, oligomers have a substantial number of reactive groups available for reaction, whereas polymers have a more crosslinked structure.

The ink vehicle preferably comprises a substantial majority of the ink composition. Thus, in preferred embodiments, the ink vehicle comprises, for example, about 80 to about 99.5%, preferably about 85 to about 95%, by weight of the ink.

Most preferably, the at least one radically curable monomer or oligomer is an acrylate. There are generally three major classes of acrylates: epoxy, polyester and polyurethane. Epoxy acrylates are often amine functionalized to act as synergists in the photoinitiation. Combined with an appropriate photoinitiator, acrylates provide rapid cure to form tough materials with good adhesion. The selection criteria for suitable acrylate monomers and oligomers include the aforementioned low viscosity, as well as low volatility, low skin irritation, and rapid cure properties.

The speed of cure can be controlled by raising the functionality of the acrylate. For instance, a trifunctional acrylate provides a more rapid cure rate than a difunctional monomer or oligomer. However, the higher functionality may produce a more brittle cured product, and may limit the ultimate extent of cure. As a result, in a preferred embodiment, a desirable balance of properties is achieved by using mixtures of acrylates, preferably mixtures of multifunctional monomer or oligomer acrylates, e.g., mixtures of difunctional and higher functional acrylates.

Based on the above criteria, a number of acrylate materials may be used in inks of embodiments of the invention. For example, as the multifunctional acrylate monomer or oligomer, mention may be made of diacrylates such as propoxylated neopentyl glycol diacrylate (viscosity of 15 mPa*s (cP) at 25° C.) (available from Sartomer Co. Inc. as SR 9003), hexanediol diacrylate (viscosity of 6 mPa*s at 25° C.), tripropylene glycol diacrylate (viscosity of 11 mPa*s at 25° C.), dipropylene glycol diacrylate (viscosity of 8 mPa*s at 25° C.), and the like. As triacrylate or higher functionality monomers or oligomers, mention may be made of amine modified polyether acrylates (available as PO 83 F (viscosity of 9-150 mPa*s at 23° C.), LR 8869 (viscosity of 80-120 mPa*s at 23° C.), and LR 8889 (viscosity of 80-140 mPa*s at 25° C.) (all available from BASF Corporation)), trimethylolpropane triacrylate (viscosity of 44-130 mPa*s at 25° C.), dipentaerythritol penta-/hexa-acrylate (solid at 22° C.), ethoxylated pentaerythritol tetraacrylate (viscosity of 150 mPa*s at 25° C.) (available from Sartomer Co. Inc. as SR 494), and the like.

In a preferred embodiment, the ink comprises an ink vehicle that is a mixture of at least an acrylate material having a functionality of two and an acrylate material having a functionality of three or more. In this embodiment, the acrylate material having a functionality of two preferably comprises about 60 to about 95% of the weight of the ink vehicle and the acrylate material having a functionality of three or more comprises about 5 to about 40% by weight of the ink vehicle.

The ink vehicle may also include monofunctional acrylates. Monofunctional acrylates are less preferred due to their reduced reactivity and potential for remaining unbound following cure. However, the monofunctional acrylates may be beneficially included in the ink vehicle in minor amounts for the purpose of viscosity adjustment. Suitable monofunctional monomers include: tridecyl acrylate (viscosity of 7 mPa*s at 25° C.), 2-phenoxyethyl acrylate (viscosity of 8 mPa*s at 25° C.), 4-t-butylcyclohexyl acrylate (viscosity of 9 mPa*s at 25° C.), octyl/decyl acrylate (viscosity of 4 mPa*s at 25° C.), isodecyl acrylate (viscosity of 5 mPa*s at 25° C.), 2-(2-ethoxyethoxy)ethyl acrylate (viscosity of 6 mPa*s at 25° C.), lauryl acrylate (viscosity of 6 mPa*s at 25° C.), isobornyl acrylate (viscosity of 9 mPa*s at 25° C.), isooctyl acrylate (viscosity of 5 mPa*s at 25° C.), isobornyl methacrylate (viscosity of 11 mPa*s at 25° C.), isodecyl methacrylate (viscosity of 5 mPa*s at 25° C.), and lauryl methacrylate (viscosity of 6 mPa*s at 25° C.).

In addition to maintaining a low viscosity, the ink vehicle constituents should preferably be chosen to achieve Newtonian fluid behaviour. This means that the ink vehicle should experience little viscosity change as a result of shear. As a general principle, this can be done by avoiding the use higher amounts of higher molecular weight oligomers.

The monomer/oligomer ink vehicle should also preferably be an acceptable pigment media. As the pigment colorant media, any suitable pigment may be used without limitation so long as the colorant is dispersible within the ink vehicle. Examples of suitable pigments include, but are not limited to, PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL® 330 (Cabot), Carbon Black 5250 (Columbia Chemical), Carbon Black 5750 (Columbia Chemical), mixtures thereof and the like.

The colorant is preferably included in the ink in an amount of from, for example, about 0.1 to about 15% by weight of the ink, preferably about 0.5 to about 6% by weight of the ink.

Examples of the at least one photoinitiator to include in the ink include 1-hydroxy-cyclohexylphenylketone, benzophenone, 2,4,6-trimethylbenzophenone, 4-methylbenzophenone, 2-benzyl 2-dimethylamino 1-(4-morpholinophenyl) butanone-1,2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, 2,4,6-trimethylbenzoylphenylphosphinic acid ethyl ester, oligo(2-hydroxy-2-methy-1-(4-(1-methylvinyl)phenyl)propanone), 2-hydroxy-2-methyl-1-phenyl-1-propanone, benzyl-dimethylketal, and isopropylthioxanthone. Amine synergists may also be used, for example such as ethyl-4-dimethylaminobenzoate and 2-ethylhexyl-4-dimethylamino benzoate. This list is not exhaustive, and any known photoinitiator that initiates the free radical reaction upon exposure to a desired wavelength of UV light can be used without limitation. The total amount of photoinitiator included in the ink may be from, for example, about 0.5 to about 15%, preferably from about 1 to about 10%, by weight of the ink.

The ink according to embodiments of the invention undergoes a radical curing technique. This means the ink is capable of absorbing radiation and producing free radicals that initiate free radical polymerization of the polymerizable compounds, causing the ink to cure and harden. The component of the ink that usefully absorbs radiation is the photoinitiator. Absorption of a photon of light promotes an electron from a low energy orbital to a high energy orbital within the photoinitiator molecule. The molecule with an electron in a high energy orbital is in its excited state. From this excited state, various pathways can be followed; there are three typical pathways that are useful to effecting cure of the ink. All three pathways ultimately result in the production of a free radical that can react with the carbon-carbon double bond of the acrylate groups in the ink. The three pathways for the excited photoinitiator molecule are: direct fragmentation via homolytic bond cleavage to produce at least one radical of sufficient energy to initiate acrylate polymerization; a bimolecular reaction where the excited molecule abstracts a hydrogen atom from another differently structured molecule and this second molecule initiates acrylate polymerization; and the excited molecule transfers its energy to another differently structured molecule that then initiates polymerization.

Often, several photoinitiators are used to most efficiently harvest the light energy supplied by the UV light source. For instance, the phosphine oxide class of photoinitiators, such as diphenyl-(2,4,6-trimethylbenzoyl)phospine oxide, are known to be very light sensitive and absorb at longer wavelengths of light, up to about 400 nm. These properties make this class of photoinitiators useful in pigmented inks because they absorb light where pigments often have little absorption (~400 nm) and their sensitivity allows these photoinitiators to initiate polymerization deep in a pigmented ink where little light has penetrated. Initiators with these properties are said to be useful for depth cure. However, phosphine oxides may not efficiently initiate polymerization in the presence of oxygen. Oxygen is known to interfere with free radical reactions. UV curing systems typically have sufficiently high levels of photoinitiator that there is enough to consume the oxygen present and initiate the polymerization. The difficulty arises when fresh oxygen can diffuse to the active free radical polymerization and slow or stop it. These conditions are most likely to occur at the surface of ink or coating when the irradiation takes place in air. Other photoinitiator systems are used to overcome the presence of higher levels of oxygen near the surface of the coating. Examples of photoinitiators that function well near the surface are 2-methyl-1-(4-methylthio)phenyl-2-(4-morphorlinyl)-1-propanone or the combination of isopropylthioxanthone or benzophenone and a suitable amine functionality such as the oligomer PO94 F from BASF or small molecule amines such as ethyl 4-(dimethylamino)benzoate. Such photoinitiator systems are effective for surface cure.

The photoinitiators initiate the polymerization of activated carbon-carbon double bonds to form chains of single bonds. Activation of carbon-carbon double bonds to free radical polymerization is generally achieved through conjugation with other double bonds such as occurs with acrylate, methacrylate and styrenic groups. Styrene derivatives often have other photochemical pathways available to them that interfere with the desired polymerization or curing of the ink. Methacrylate groups offer good mechanical properties upon cure but are typically slower to polymerize than acrylate groups. Thus, for rapidly curing inks for use in high speed printers, acrylate functionality is preferred as the predominate type of reactive group. The monomers and oligomers are chosen to provide good properties upon cure, rapid polymerization, low viscosity for jetting, and safe handling.

The inks of embodiments of the invention are preferably substantially free of, more preferably are free of, any solvents. Such solvent free inks are often termed solid ink jet inks, even though the inks may not actually be solid.

The inks of embodiments of the invention may further include conventional type additives to take advantage of the known functionality associated with such conventional additives. Such additives may include, for example, defoamers, slip and levelling agents, pigment dispersants, etc.

The following example inks were prepared to further illustrate embodiments of the invention.

EXAMPLE 1

The following materials were combined:

| | |
|---|---|
| Propoxylated neopentyl glycol diacrylate (Sartomer SR 9003) | 8.58 g |
| Amine modified polyether acrylate (BASF PO 83 F) | 1.65 g |
| 2-benzyl 2-dimethylamino 1-(4-morpholinophenyl) butanone-1 (Ciba Irgacure 369) | 0.55 g |
| C.I. Solvent Red 49 | 0.22 g |

The ink was imaged onto a transparency using a K Printing Proofer (R. K. Print-Coat Instruments Ltd.) employing a 3 wedge Gravure plate, 60 lines per cm, and density 100, 80, 60% (there are three printed patches in which different amounts of ink are deposited; a Gravure plate consists of small depressions or cells that hold the ink, when the paper passes over the plate some of the ink is transferred from the cell to the paper; a density of 100% means the maximum number of cells that can be reasonably placed on the plate, while 80% density means that there are 80% of the maximum number cells in the unit area, etc.). Good solid images were obtained at ambient temperatures (~22° C.). The images were cured using a UV Vision LC-6B Benchtop Conveyor. A single pass with a belt speed of 32 ft/sec provides the following radiative energies: UV A (315-400 nm) 1.3-1.5 w/cm$^2$, UV B (280-315 nm) 1.0-1.4 w/cm$^2$ and UV C (200-280 nm) 0.15-0.28 w/cm$^2$. The photoinitiator has an absorption maximum at about 320 nm, and so both UV A and UV B radiation will participate in the cure. The image is hard and well adhered to the substrate after a single curing. Additional curing leads to further reduction in the number of vinyl bonds observed by FTIR measurements.

The viscosity of the ink was measured using a Thermo-Haake Viscotester VT 550 employing a NV coaxial cylinder sensor. The viscosity falls in the anticipated range, although at temperatures of 35-40° C., the viscosity is lower than desired. The viscosity at this temperature can be easily raised by increasing the level of a higher viscosity component without sacrificing image quality.

EXAMPLES 2-8

Example 1 was repeated in Examples 2-8, with different inks as summarized in the following Table.

TABLE

| Material (g) | Example | | | | | | |
|---|---|---|---|---|---|---|---|
| | 2 | 3 | 4 | 5 | 6 | 7 | 8 |
| Propoxylated neopentyl glycol diacrylate (Sartomer SR 9003) | 8.58 | 10.14 | 8.36 | 7.7 | 7.4 | 7.7 | 12.65 |
| Amine modified polyether acrylate (BASF PO 83 F) | 1.65 | 1.95 | 1.65 | 1.5 | 1.5 | 1.5 | 2.40 |
| 2-benzyl 2-dimethylamino 1-(4-morpholinophenyl) butanone-1 (Ciba Irgacure 369) | 0.55 | 0.65 | 0.55 | 0.5 | 0.5 | 0.5 | 0.786 |
| Solvent Yellow 162 | 0.22 | | | | | | |
| Solvent Blue 808 | | 0.26 | | | | | |
| Solvent Red 49 | | | 0.44 | | | | |
| Hansa bril yellow SGX 03(B) pigment | | | | 0.3 | 0.6 | | |
| Pigment red 57:1 | | | | | | 0.3 | |
| Irgalite Blue NGA | | | | | | | 0.486 |

In Examples 5-7, the pigment dispersion was achieved by sonication; in Example 8, the pigment dispersion was achieved by ball milling for 48 hrs.

The UV curable inks of embodiments of the invention are most preferably suited for use in a piezoelectric ink jet device. When using a piezoelectric ink jet printer, the temperature of the print head is preferably maintained between about 30° C. and about 50° C. to achieve a preferable jetting viscosity of the low viscosity curable ink. If the temperature greatly exceeds the preferred range, the low viscosity curable ink may begin to polymerize and harden. If this occurs, the ink will thicken, and will not be properly ejected from the printhead. If the temperature is too low, the ink may be too thick for jetting and may potentially clog the jets.

The inks of embodiments of the invention are preferably jetted directly from a printhead onto an image receiving substrate, such as paper or a transparency. Following jetting of the ink onto the substrate to form a desired image, the ink is then exposed to an appropriate UV light, provided from any suitable UV light source, in order to cure the ink in the manner discussed above. The radiative energies that may be used to cure the ink image formed on the image receiving substrate include, for example, UV A (315-400 nm) 0.3-1.8 w/cm$^2$, UV B (280-315 nm) 0.4-1.6 w/cm$^2$ and UV C (200-280 nm) 0.05-0.4 w/cm$^2$. To effect the desired amount of cure, the ink on the image receiving substrate may be exposed to the radiation for a few seconds or less, for example about 0.1 to about 3 seconds.

While various embodiments have been described above, it is evident that many alternatives, modifications and variations will be apparent to those skilled in the art. Accordingly, the preferred embodiments, as set forth above, are intended to be illustrative and not limiting. Various changes may be made without departing from the spirit and scope of the invention.

What is claimed is:

1. An ink for an ink jet printer, comprising an ink vehicle comprising at least one radically curable, multifunctional acrylate monomer and at least one radically curable, multifunctional acrylate oligomer, at least one colorant, and at least one photoinitiator, wherein the ink is substantially free of solvents, and wherein the at least one multifunctional acrylate monomer and the at least one multifunctional acrylate oligomer is selected from the group consisting of: propoxylated neopentyl glycol diacrylate, hexanediol diacrylate, tripropylene glycol diacrylate, dipropylene glycol diacrylate, amine modified polyether acrylates, trimethylolpropane triacrylate, dipentaerythritol penta-/hexa-acrylate, ethoxylated pentaerythritol tetraacrylate, and mixtures thereof.

2. The ink according to claim 1, wherein the ink vehicle further comprises at least one monofunctional acrylate monomer.

3. The ink according to claim 1, wherein the at least one colorant is a pigment.

4. The ink according to claim 1, wherein the at least one photoinitiator is selected from the group consisting of: 1-hydroxy-cyclohexylphenylketone, benzophenone, 2,4,6-trimethylbenzophenone, 4-methylbenzophenone, 2-benzyl 2-dimethylamino 1-(4-morpholinophenyl)butanone-1,2-methyl-1-(4-methylthio)phenyl-2-(4-morpholino)-1-propanone, diphenyl-(2,4,6-trimethylbenzoyl)phosphine oxide, phenyl bis(2,4,6-trimethylbenzoyl)phosphine oxide, 2,4,6-trimethylbenzoylphenylphosphinic acid ethyl ester, oligo(2-hydroxy-2-methy-1-(4-(1-methylvinyl)phenyl)propanone), 2-hydroxy-2-methyl-1-phenyl-1-propanone, benzil dimethylketal, isopropylthioxanthone, and mixtures thereof.

5. The ink according to claim 1, wherein the at least one photoinitiator comprises about 0.5 to about 15% by weight of the ink.

6. The ink according to claim 1, wherein the ink has a viscosity of between about 8 and about 15 cP at temperatures of from about 30 to about 50 ° C.

7. The ink according to claim 1, wherein the ink is free of solvent.

8. The ink according to claim 1, wherein the ink is curable upon exposure to ultraviolet radiation.

9. The ink according to claim 1, wherein the ink vehicle further comprises an amine synergist.

10. An ink for an ink jet printer, comprising an ink vehicle comprising at least one acrylate monomer or oligomer having a functionality of two and at least one acrylate monomer or oligomer having a functionality of three or more, at least one colorant, and at least one photoinitiator, wherein the ink is substantially free of solvents, and wherein the ink vehicle includes at least one acrylate monomer having a functionality of two or a functionality of three or more and at least one acrylate oligomer having a functionality of two or a functionality of three or more;

wherein the at least one acrylate monomer or oligomer having a functionality of two is selected from the group consisting of: propoxylated neopentyl glycol diacrylate, hexanediol diacrylate, tripropylene glycol diacrylate, dipropylene glycol diacrylate, and mixtures thereof; and wherein the at least one acrylate monomer or oligomer having a functionality of three or more is selected from the group consisting of: amine modified polyether acrylates, trimethylolpropane triacrylate, dipentaerythritol penta-/hexa-acrylate, ethoxylated pentaerythritol tetraacrylate, and mixtures thereof.

11. The ink according to claim 10, wherein the at least one acrylate monomer or oligomer having a functionality of two is present in an amount of about 60 to about 95% by weight of the ink vehicle.

12. The ink according to claim 10, wherein the ink vehicle further comprises at least one monofunctional acrylate monomer.

13. The ink according to claim 10, wherein the at least one colorant is a pigment.

14. The ink according to claim 10, wherein the at least one photoinitiator is selected from the group consisting of: 1-hydroxy-cyclohexylphenylketone, benzophenone, 2,4,6-trimethylbenzophenone, 4-methylbenzophenone, 2-benzyl 2-dimethylamino 1-(4-morpholinophenyl)butanone-1,2-methyl-1-(4-methylthio)phenyl-2-(4-morphorlino)-1-propanone, diphenyl-(2,4,6-trimethylbenzoyl)phosphine oxide, phenyl bis(2,4,6-trimethylbenzoyl)phosphine oxide, 2,4,6-trimethylbenzoylphenylphosphinic acid ethyl ester, oligo(2-hydroxy-2-methy-1-(4-(1-methylvinyl)phenyl)propanone), 2-hydroxy-2-methyl-1-phenyl-1-propanone, benzil dimethylketal, isopropylthioxanthone, and mixtures thereof.

15. The ink according to claim 10, wherein the at least one photoinitiator comprises about 0.5 to about 15% by weight of the ink.

16. The ink according to claim 10, wherein the ink has a viscosity of between about 8 and about 15 cP at temperatures of from about 30 to about 50° C.

17. The ink according to claim 10, wherein the ink is free of solvent.

18. The ink according to claim 10, wherein the ink is curable upon exposure to ultraviolet radiation.

19. The ink according to claim 10, wherein the ink vehicle further comprises an amine synergist.

* * * * *